April 19, 1932.　　　　D. L. OGDEN　　　　1,854,664
METHOD OF RECOVERING ZINC COMPOUNDS FROM AMMONIACAL SOLUTIONS
Filed July 27, 1928
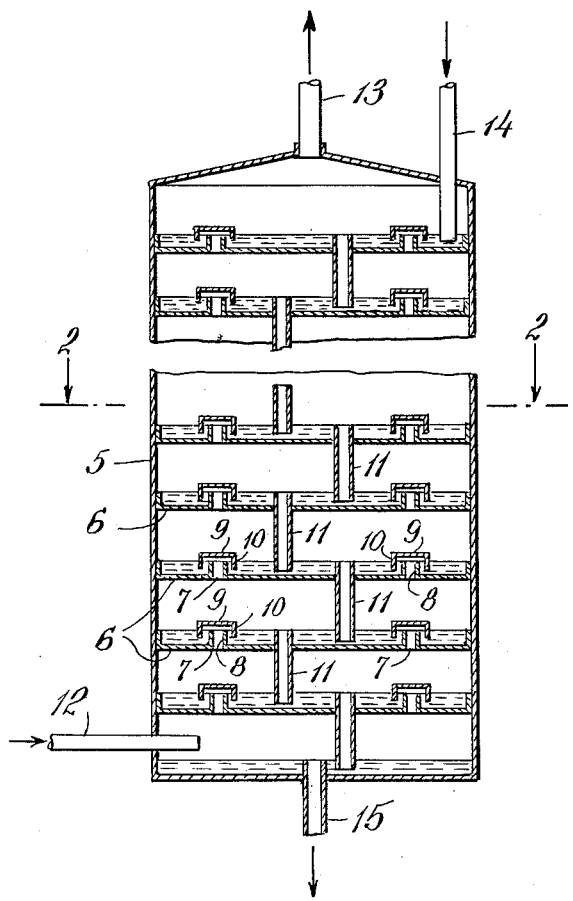
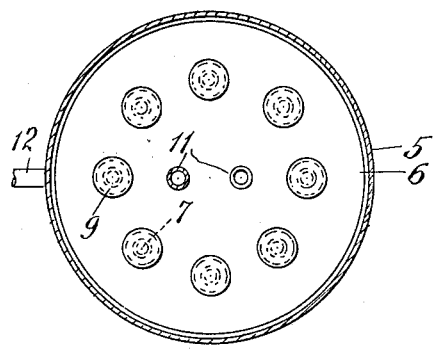
INVENTOR
Daniel L. Ogden
BY
Pennie Davis Marvin & Edmonds
ATTORNEYS Patented Apr. 19, 1932

1,854,664

UNITED STATES PATENT OFFICE

DANIEL LATTIMER OGDEN, OF WOODBRIDGE, NEW JERSEY, ASSIGNOR TO THE AMERICAN METAL COMPANY, LIMITED, OF NEW YORK, N. Y., A CORPORATION OF NEW YORK

METHOD OF RECOVERING ZINC COMPOUNDS FROM AMMONIACAL SOLUTIONS

Application filed July 27, 1928. Serial No. 295,636.

This invention relates to a method of recovering zinc compounds, and particularly to the separation of basic zinc carbonate from ammoniacal zinc carbonate solutions.

Zinc oxide is soluble in a carbonated ammoniacal liquor and may be selectively separated from materials including zinc oxide and compounds of other elements by leaching with liquor containing ammonia and carbon dioxide. Liquors containing as much $CO_2$ as ammonia are particularly suitable for this purpose, thus a liquor with 6% $NH_3$ and 6% $CO_2$ may be used. When such an ammoniacal zinc carbonate solution is heated, for example, with steam in an ordinary boiler, the ammonia and part of the carbon dioxide is distilled and a precipitate of basic zinc carbonate is separated. It contains 54.8% Zn and 24.84% $CO_2$ and may be expressed as $2(ZnCO_3.Zn(OH)_2)$. This precipitate is, however, flocculent and gelatinous, and it cannot be separated readily from the solution. Moreover, it is practically impossible to wash the precipitate satisfactorily for the removal of impurities which may be present.

It is the object of the present invention to provide a method of separating a granular precipitate from carbonated ammoniacal zinc solutions.

I have discovered that an ammoniacal zinc solution, if heated while traveling in relatively thin layers by means of steam or equivalent heating medium, will precipitate a coarse granular zinc compound instead of the gelatinous material which is normally recovered. The granular product is carried along by the stream of liquor to a collecting vessel and separates rapidly therein from the liquor. It is easily washed and thus freed from impurities and can be decanted, filtered, centrifuged or otherwise separated from the mother liquor or washing medium. This precipitate analyzes 57.4% Zn and 27.61% $CO_2$ and corresponds to $5(ZnCO_3).2(ZnO)$.

The ammoniacal zinc carbonate solution may be prepared in any suitable way, for example, by leaching zinc oxide-containing material with ammonia liquor containing carbon dioxide. The zinc oxide is dissolved in the liquor which may contain varying proportions thereof, depending upon the ammonia content. A satisfactory solution includes 80 grams of ammonia, 80 grams of zinc and 80 grams of carbon dioxide per liter.

The heating of the solution may be accomplished in various types of apparatus, but I prefer to employ a column comprising a plurality of superposed trays having openings through which the vapors rise and caps to force the vapors through the layers of liquor on the trays. Constant level overflow pipes permit the passage of the liquor through the column while the levels of the liquor on the trays are maintained. Steam or other heating media is introduced through the bottom of the column and passes through the several trays together with the separated ammonia. The liquor is supplied at the top of the column at a substantially constant rate and flows downwardly over the trays in contact with the steam and vapors. The heating thus effected separates ammonia and carbon dioxide from the liquor and causes a basic zinc carbonate to precipitate therefrom. The precipitate, which is granular in form, is carried from tray to tray and finally separates from the liquor in the bottom of the column or in a settler independent of the column. Any desired proportion of a suitable alkaline material, such as sodium carbonate solution, may be added to the liquor to separate the fixed ammonia. The ammonia and volatile carbon dioxide can be recovered for further use in preparing fresh ammoniacal liquor.

The granular basic zinc carbonate is separated readily from the liquor by decantation, filtration or otherwise. It can be washed readily with water to remove sulphates or other impurities present therein and again separated from the wash water by decantation, filtration or centrifuging. It may be dried and calcined to produce zinc oxide.

A suitable apparatus for the practice of the method is illustrated in the accompanying drawings, in which Fig. 1 is a vertical section through the apparatus; and Fig. 2 is a transverse section on the line 2—2 of Fig. 1.

Referring to the drawings, 5 indicates a column which is divided into a plurality of compartments by trays 6 having openings 7 with upwardly projecting flanges 8. Caps 9 are arranged above the openings with depending flanges 10. A liquid sealed passage for gases is thus provided. Overflow pipes 11 extending through each tray permit the passage of liquor downwardly and ensure a layer of liquor on each tray. The depth of these layers is determined by the upwardly projecting ends of the pipes 11, the lower ends of which depend into the layers of liquor on the succeeding trays, thus sealing the pipes. Steam or other heating medium is introduced through a pipe 12 at the lower end of the column and the vapors, consisting principally of ammonia, are withdrawn through a pipe 13 at the top of the column and are delivered to a suitable condenser (not shown). A pipe 14 permits the introduction of the liquor which escapes through a pipe 15. The structure as described is a typical still, of which numerous types are available.

In such an apparatus the ammoniacal zinc solution, either with or without the addition of sodium carbonate solution, is introduced through the pipe 14 in regulated quantity and flows downwardly over the trays in series, passing from tray to tray through the pipes 11. Steam or other heating medium is supplied through the pipe 12 and circulates upwardly through the column in intimate contact with a liquor which is thus effectively heated. The ammonia is distilled and the zinc is separated as basic zinc carbonate in granular form. The precipitate is carried by the liquor from tray to tray and finally into the bottom of the column from which the liquor with the precipitate may be withdrawn through the pipe 15.

I am unable to explain with assurance the changes which are effected in the character of the precipitate by heating the solution in the manner described. It is, however, certain that no gelatinous precipitate, such as that normally obtained by boiling an ammoniacal zinc solution, is produced by heating the solution in layers. The granular precipitate is a distinct product, having characteristics which permit satisfactory washing and easy separation from the liquor and wash water. Such a precipitate facilitates the recovery and production of zinc compounds and affords an economical procedure for the preparation of commercial zinc products.

Various changes may be made in the details of operation without departing from the invention or sacrificing any of the advantages thereof.

I claim:

1. The method of recovering a granular precipitate from ammoniacal zinc carbonate solutions, which comprises flowing the solution continuously in a series of relatively thin layers and heating the layers.

2. The method of recovering a granular precipitate from ammoniacal zinc carbonate solutions, which comprises flowing the solution continuously in a series of relatively thin layers and heating the layers with a gaseous heating medium.

3. The method of recovering a granular precipitate from ammoniacal zinc carbonate solutions, which comprises flowing the solution counter-current to a gaseous heating medium and causing the heating medium to contact with relatively thin layers of the solution.

4. The method of recovering a granular precipitate from an ammoniacal zinc carbonate solution which comprises heating the solution while flowing in a relatively thin layer.

In testimony whereof I affix my signature.

DANIEL LATTIMER OGDEN.